Patented Oct. 10, 1944

2,359,829

UNITED STATES PATENT OFFICE 2,359,829

PROCESS FOR MANUFACTURE OF $MgCl_2$

George Gerald Day, Niagara Falls, N. Y., assignor to The Mathieson Alkali Works, Inc., New York, N. Y., a corporation of Virginia No Drawing. Application March 28, 1942, Serial No. 436,620

2 Claims. (Cl. 23—91)

This invention relates to improvements in the production of magnesium chloride, the essential raw material for the production of metallic magnesium by electrolysis of the fused chloride. The invention provides important economies, through improvement of chemical efficiency, in the production of magnesium chloride and thus in the production of metallic magnesium.

More particularly, this invention relates to improvements in the production of aqueous magnesium chloride liquors by reaction between the mixed oxides of magnesium and calcium produced by calcination of dolomite, the waste aqueous calcium chloride liquor from the ammonia soda process and carbon dioxide. In the ammonia soda process, sodium bicarbonate and ammonium chloride are formed by carbonating an aqueous ammoniacal sodium chloride liquor. The sodium bicarbonate is the commercial product of the process. The ammonia, because of its cost, must be recovered from the ammonium chloride for cyclic re-use in the process. The recovery is usually effected by decomposing the ammonium chloride with lime in a distillation operation from which an aqueous calcium chloride liquor is discharged as a waste residue.

This waste liquor containing the chlorides of calcium and sodium, about 9% $CaCl_2$ and about 4% NaCl being representative contents of these salts, constitutes a particularly advantageous raw material for the production of magnesium chloride for electrolysis since the magnesium chloride fusions subjected to electrolysis usually must include chlorides other than magnesium chloride such as sodium or potassium chloride to form an electrolyte of the desired melting point, viscosity and density. Such a magnesium chloride product can be produced from this waste calcium chloride liquor by calcining dolomite to produce mixed oxides of magnesium and calcium, adding these mixed oxides to this waste liquor to hydrate the mixed oxides and to form a slurry of the mixed hydrates, carbonating this slurry and concentrating the resulting magnesium chloride liquor after separating precipitated calcium carbonate.

However, the waste calcium chloride liquor from the ammonia soda process also contains sulphates, particularly calcium sulphate. In conventional practice, the temperature of the liquor in the decomposition-distillation operation just described is regulated to minimize scaling of the apparatus in which it is carried out with calcium sulphate hemihydrate. Scaling nevertheless usually occurs to some limited extent. The waste liquor thus contains calcium sulphate in solution and, usually, suspended calcium sulphate hemihydrate.

When mixed oxides of magnesium and calcium, produced for example by calcining dolomite, are added to such an aqueous calcium chloride liquor, hydration does not proceed uniformly, the resulting slurry is not uniform and carbonation of the resulting slurry proceeds with relatively low chemical efficiency measured in terms of magnesium chloride recovery against magnesium chloride potentially available from the mixed oxides. I have discovered that the sulphates, particularly the soluble sulphates, present in the waste calcium chloride liquor from the ammonia soda process, even though present in a relatively small amount, nevertheless impede the hydration of the mixed oxides produced by calcination of dolomite to an extent such that the formation of a uniform slurry and the realization of high chemical efficiency in subsequent carbonation of the slurry cannot be attained unless special precautions are taken.

In accordance with my invention, before adding the mixed oxides to the waste calcium chloride liquor, I precipitate the sulphates present in the liquor, advantageously by adding sufficient barium chloride or other soluble barium salt to the liquor to precipitate the sulphates as barium sulphate, and then add the mixed oxides of magnesium and calcium to the calcium chloride liquor thus freed from soluble sulphates to hydrate the mixed oxides and to form a slurry of the mixed hydrates. The precipitated barium sulphate need not be separated from the liquor prior to addition of the mixed oxides of magnesium and calcium since the sulphates present in insoluble form, as barium sulphate, do not interfere with the hydration. Suspended calcium sulphate hemihydrate may, however, be settled from the liquor prior to addition of the mixed oxides. The soluble barium salt is with advantage added as an aqueous solution to facilitate the reaction precipitating the sulphates present in the waste calcium chloride liquor. The proportion of soluble barium salt added should correspond, stoichiometrically, with the proportion of soluble sulphates present in the waste liquor.

In operation, for example: 100 tons per day of dolomite may be calcined in a rotary kiln to produce about 50 tons per day of mixed oxides and about 69 tons per day of $CO_2$ in a gas mixture of 25% concentration. The mixed oxides may be added to about 561 tons per day of a waste calcium chloride liquor from the ammonia soda process containing about 9.2% $CaCl_2$, about 4.1%

NaCl and about 0.2% CaSO₄, after treatment with about 8.6 tons of an aqueous solution containing 20% BaCl₂ in accordance with my invention, and the resulting slurry of mixed hydrates is carbonated, for example with part of the gas mixture produced in calcination of the dolomite. About 42 tons per day of carbon dioxide may be absorbed in this carbonation. After separation of precipitated calcium carbonate, together with the precipitated barium sulphate, about 664 tons per day of an aqueous liquor containing about 6.7% MgCl₂ and about 3.4% NaCl may be produced in this manner.

I claim:

1. In the production of aqueous magnesium chloride liquors by carbonating slurries of mixed hydrates of magnesium and calcium in aqueous calcium chloride liquors containing soluble sulphates, the improvement which comprises calcining dolomite to form mixed oxides of magnesium and calcium, first adding sufficient of a soluble barium salt to the calcium chloride liquor to precipitate the sulphates and then adding the mixed oxides to the calcium chloride liquor previously freed from soluble sulphates to hydrate the mixed oxides and to form a slurry of the mixed hydrates.

2. In the production of aqueous magnesium chloride liquors by carbonating slurries of mixed hydrates of magnesium and calcium in aqueous calcium chloride liquors containing soluble sulphates, the improvement which comprises calcining dolomite to form mixed oxides of magnesium and calcium, first precipitating sulphates from the calcium chloride liquor and then adding the mixed oxides to the calcium chloride liquor previously freed from soluble sulphates to hydrate the mixed oxides and to form a slurry of the mixed hydrates.

GEORGE GERALD DAY.